3,382,193
RESINOUS COMPOSITIONS
James Caithness Cuthill, Ardrossan, Scotland, assignor to Imperial Chemical Industries Limited, London, England, a corporation of Great Britain
No Drawing. Filed Aug. 22, 1966, Ser. No. 573,848
Claims priority, application Great Britain, Sept. 9, 1965, 38,529/65
7 Claims. (Cl. 260—2)

ABSTRACT OF THE DISCLOSURE

A resinous product is produced by reacting a compound of the formula

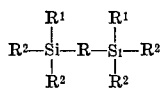

with a compound of the formula

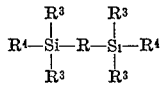

where R is phenylene, diphenylene or diphenylene oxide, $R^1$ and $R^3$ are monovalent unsubstituted or halogen substituted hydrocarbon groups, $R^2$ is alkoxy, hydroxy or mixtures thereof, and $R^4$ is acyloxy, alkoxy or hydroxy, $R^4$ being acyloxy or hydroxy when $R^2$ is alkoxy. The reaction may use a tin or zinc carboxylic acid salt as catalyst and may be in the presence of solvent. The resinous products may be converted to shaped objects and cured.

---

This invention relates to new and useful resinous compositions and more particularly to such compositions based on organosilicon polymers.

A wide variety of resinous compositions based on organosilicon polymers are known and are readily available. These find many uses, the most important uses in each case being very largely determined by the nature and structure of the organic portion of the composition.

According to the present invention new and useful resinous compositions are provided by a process comprising reacting a compound of the general formula I 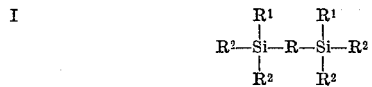

where R is a phenylene, diphenylene or diphenyloxide group, $R^1$ is a monovalent hydrocarbon or substituted hydrocarbon group and $R^2$, all of which may or may not be alike, is an alkoxy or hydroxy group, with a compound of the general formula II 

where R is as defined above, $R^3$, all of which may or may not be alike, is a monovalent hydrocarbon or substituted hydrocarbon group and $R^4$ is an acyloxy, alkoxy or hydroxy group, provided that when $R^2$ is an alkoxy group $R^4$ is an acyloxy or hydroxy group.

While the group R may be a phenylene, diphenylene or diphenyleneoxide group it is for many purposes preferred that it be a phenylene group.

The groups $R^1$ may be selected from a wide variety of monovalent hydrocarbon or substituted hydrocarbon groups and may be unsubstituted or substituted alkyl, aryl, alkaryl, aralkyl, cycloalkyl, alkenyl or cycloalkenyl groups. Suitable groups include, for example, methyl, ethyl, propyl, 3,3,3-trifluoropropyl, vinyl, cyclohexyl, phenyl, tetrachlorophenyl, tolyl, benzyl and cyclopentenyl groups. In many cases it is preferred that they be phenyl groups.

The groups $R^2$ may be any one of a variety of alkoxy groups or may be a hydroxy group. Suitable alkoxy groups include, for example, methoxy, ethoxy, propoxy, isopropoxy and isobutoxy groups.

The groups $R^3$ may be selected from the same groups as the $R^1$ groups. It is preferred that the groups $R^3$ be phenyl groups and it is frequently preferred that the $R^1$ and $R^3$ groups be all alike and that they be phenyl groups.

The groups $R^4$ may be any one of a wide variety of alkoxy or acyloxy groups or may be hydroxy groups provided that when the $R^2$ groups are alkoxy groups the $R^4$ groups are acyloxy or hydroxy groups. Suitable alkoxy groups which may be used include, for example, methoxy, ethoxy, propoxy, isopropoxy and isobutoxy groups. Acetoxy groups are particularly useful when acyloxy groups are to be used.

The two compounds may be reacted together in widely varying proportions. Thus for every 4 moles of compound II there may be used from 1 to 4 or more moles of compound I. It is, however, in general preferred to use from 2 to 3 moles of compound I for every 4 moles of compound II. It is unnecessary for there to be any excess of reactive groups and it is in fact frequently desirable that there should not be any free reactive groups in the product.

It is normally preferred and in some cases essential to carry out the reaction in presence of a catalyst of the kind known to be suitable for reaction between a compound having an ≡Si—OH group and a compound having an ≡SiOR group. Suitable catalysts include, for example, carboxylic acid salts of tin such as stannous octoate, dibutyl tin dilaurate, dibutyl tin-2-ethyl hexoate and other salts such as zinc octoate. In many cases stannous octoate is preferred. The catalyst may be used in widely varying amount, for example, up to 5 percent or more by weight of the reactants. In general it is, however, preferred to use amounts of from 0.5 to 1.5 percent.

In the cases where $R^2$ are hydroxy groups and $R^4$ are acyloxy groups excellent results are obtained without the use of a catalyst.

The reaction may be carried out over a wide range of temperature, for example, from 80 to 200° C. or higher. The actual temperature preferred in any particular case, however, will be governed by the specific reactants and solvent, if any, used. In general it is preferable to operate at the highest practicable temperature and this may well be the refluxing temperature of the mixture.

The reaction may, if desired, be carried out in presence of an inert solvent and in fact it is normally preferred to use a solvent. Suitable solvents which may be used include, for example, toluene, xylene, o-dichlorobenzene and the like. The amount, if any, of solvent used may vary widely, for example, from 70 to 200 or more percent by weight of the reactants. Any solvent used may be partially or completely removed after reaction is complete to give either a stable resin or a stable resin solution.

The time required for reaction will, of course, vary with the particular reactants used, the proportions thereof, the solvent used, if any, and the temperature of reaction. Normally reaction is complete in from 1 to 2 hours but further heating, for example up to 6 hours, does not affect the stability of the product except in the absence of solvent. The extent of the reaction may be determined by withdrawing a sample, removing any solvent therefrom and heating to the insoluble, infusible state. Reaction is normally considered adequate when the cure time at 250° C. is not greater than about 30 minutes.

The resins and resin solutions of our invention can be used for a wide variety of purposes, for example, casting of films, preparation of laminates, such as glass or asbestos fibre laminates, preparation of glass or asbestos fibre filled moulding powders and the like and can be cured to infusible, insoluble products by heating at temperatures of, for example, 150 to 250° C.

Our invention is further illustrated by the following examples in which all parts and percentages are by weight.

Example 1

237 parts of 1,4-bis(diphenylhydroxysilyl)benzene and 146 parts of 1,4-bis(diethoxyphenylsilyl)benzene were dissolved in 250 parts of o-dichlorobenzene by heating. 5 parts of stannous octoate were added and the mixture heated under reflux for 3 hours. The mixture was then cooled and filtered whereby a clear resin solution was obtained. A film cast from this solution cured to the insoluble, infusible state on heating for 10 minutes at 180° C.

Example 2

180 parts of 1,4-bis(phenyldihydroxysilyl)benzene and 310 parts of 1,4-bis(acetoxydimethylsilyl)benzene were dissolved in 350 parts of toluene and the mixture heated under reflux for 3 hours. The solution was then cooled and filtered whereby there was obtained a clear resin solution. A film cast from this resin solution cured to the insoluble, infusible state on heating for 10 minutes at 200° C.

Example 3

90 parts of 1,4-bis(phenyldihydroxysilyl)benzene and 260 parts of 1,4-bis(diphenylethoxysilyl)benzene were dissolved in 300 parts of o-dichlorobenzene by heating. 5 parts of stannous octoate were added and the mixture heated under reflux for 8 hours. The mixture was then cooled and filtered whereby a clear resin solution was obtained. A film cast from this solution cured to the insoluble, infusible state on heating for 30 minutes at 250° C.

Example 4

117 parts of p-bis(diethoxyphenylsilyl)benzene and 155 parts of p-bis(acetoxydimethylsilyl)benzene were dissolved in 150 parts of o-dichlorobenzene and heated to 100° C. 2.5 parts of stannous octoate were then added and the mixture heated under reflux for 2 hours. A clear resin solution was obtained. A film cast from this solution cured to the insoluble infusible state on heating at 200° C. for 5 mins.

What I claim is:

1. A resinous composition produced by reacting by heating at a temperature of 80–200° C. in presence of a solvent a compound of the general formula I 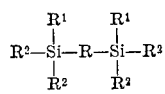

with a compound of the general formula

II 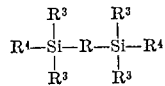

where R is selected from the group consisting of phenylene, diphenylene and diphenylene oxide groups, $R^1$ and $R^3$ are selected from the group consisting of monovalent unsubstituted hydrocarbon and halogen substituted hydrocarbon groups, $R^2$ is selected from the group consisting of alkoxy radicals, hydroxy radicals and mixtures thereof, and $R^4$ is selected from the group consisting of acyloxy, alkoxy and hydroxy radicals, provided that when $R^2$ is an alkoxy radical, $R^4$ is an acyloxy or hydroxy radical.

2. A resinous composition as set forth in claim 1 wherein the group $R^2$ is selected from the group consisting of methoxy, ethoxy, propoxy, isopropoxy and isobutoxy groups.

3. A resinous composition as set forth in claim 1 in which the groups $R^4$ are selected from the group consisting of methoxy, ethoxy, propoxy, isopropoxy and isobutoxy groups.

4. A resinous composition as set forth in claim 1 wherein the compounds are reacted in the proportion of from 1 to 4 moles of compound I from every 4 moles of compound II.

5. A resinous composition as set forth in claim 4 wherein the compounds are reacted in the proportion of 2 to 3 moles of compound I for every 4 moles of compound II.

6. A resinous composition as set forth in claim 1 wherein the groups $R^1$ and $R^3$ are selected from the group consisting of unsubstituted and halogen substituted alkyl, aryl, alkaryl, aralkyl, cycloalkyl, alkenyl and cycloalkenyl radicals.

7. A resinous composition as set forth in claim 1 wherein the groups $R^1$ and $R^3$ are selected from the group consisting of methyl, ethyl, propyl, 3,3,3-trifluoropropyl, vinyl, phenyl, cyclohexyl, tetrachlorophenyl, tolyl, benzyl and cyclopentenyl radicals.

References Cited

UNITED STATES PATENTS

| | | | |
|---|---|---|---|
| 3,287,310 | 11/1966 | Omietanski | 260—46.5 |
| 2,562,000 | 7/1951 | Sveda | 260—46.5 |
| 3,160,601 | 12/1964 | Hyde | 260—18 |
| 3,296,197 | 1/1967 | Wu | 260—46.5 |

DONALD E. CZAJA, *Primary Examiner.*

M. I. MARQUIS, *Assistant Examiner.*